(12) United States Patent
Ewers et al.

(10) Patent No.: US 10,240,656 B2
(45) Date of Patent: Mar. 26, 2019

(54) VALVE ARRANGEMENT WITH IMPROVED FAILSAFE OPERATION

(71) Applicant: ÖHLINS RACING AB, Upplands Väsby (SE)

(72) Inventors: Benny Ewers, Vetlanda (SE); Fredrik Larsson, Jönköping (SE); Simon Ivarsson, Jönköping (SE)

(73) Assignee: ÖHLINS RACING AB, Upplands Väsby (SE)

( * ) Notice: Subject to any disclaimer, the term of this patent is extended or adjusted under 35 U.S.C. 154(b) by 0 days.

(21) Appl. No.: 15/519,522

(22) PCT Filed: Oct. 12, 2015

(86) PCT No.: PCT/EP2015/073585
§ 371 (c)(1),
(2) Date: Apr. 14, 2017

(87) PCT Pub. No.: WO2016/062573
PCT Pub. Date: Apr. 28, 2016

(65) Prior Publication Data
US 2017/0234395 A1    Aug. 17, 2017

(30) Foreign Application Priority Data

Oct. 21, 2014  (EP) .................................. 14189715

(51) Int. Cl.
| F16K 31/06 | (2006.01) |
| F16F 9/46 | (2006.01) |
| F16F 9/34 | (2006.01) |

(52) U.S. Cl.
CPC ............... *F16F 9/465* (2013.01); *F16F 9/34* (2013.01); *F16F 9/466* (2013.01); *F16K 31/0686* (2013.01); *F16F 2230/24* (2013.01)

(58) Field of Classification Search
None
See application file for complete search history.

(56) References Cited

U.S. PATENT DOCUMENTS

2009/0288924 A1   11/2009   Murray

FOREIGN PATENT DOCUMENTS

| CN | 101025213 A | 6/2011 |
| DE | 3924168 A1 | 1/1991 |
| DE | 4107600 A1 | 9/1992 |
| DE | 4137403 A1 | 5/1993 |

(Continued)

OTHER PUBLICATIONS

International Search Report and Written Opinion dated Jan. 21, 2016 for International Application No. PCT/EP2015/073585, in 13 pages.

*Primary Examiner* — John Fox
(74) *Attorney, Agent, or Firm* — Knobbe, Martens, Olson & Bear, LLP

(57) ABSTRACT

A valve arrangement controls a flow of damping medium in a shock absorber. A radial column is provided with an axial failsafe flow such that the fail safe flow is not dependent on the exact axial position of the control valve member for creating the fail safe restriction, and less turbulence arise affecting the axial position of the control valve member. Thereby a valve arrangement is provided which has a more stable and reliable failsafe operation, resulting in a more dependable valve arrangement.

15 Claims, 7 Drawing Sheets

(56) References Cited

FOREIGN PATENT DOCUMENTS

| | | |
|---|---|---|
| EP | 1820996 A2 | 8/2007 |
| EP | 1953410 A1 | 8/2008 |
| EP | 1983213 | 10/2008 |
| JP | 2014173714 A | 9/2014 |
| JP | 5952760 B2 * | 6/2016 |
| WO | WO2011/040808 A2 | 4/2011 |

* cited by examiner

VALVE ARRANGEMENT WITH IMPROVED FAILSAFE OPERATION

INCORPORATED BY REFERENCE TO ANY PRIORITY APPLICATIONS

This application is a national stage application under 35 U.S.C. § 371 of PCT Application No. PCT/EP2015/073585, designating the United States, filed on Oct. 12, 2015. The PCT Application was published in English as WO2016/062573 on Apr. 28, 2016 and claims priority to European Patent Application No. 14189715.7, filed on Oct. 21, 2014. Each of the foregoing applications are hereby incorporated by reference in its entirety.

TECHNICAL FIELD OF THE INVENTION

The present invention generally relates to the field of valve arrangements. In particular, the present invention relates to a valve arrangement for controlling a flow of damping medium in a shock absorber.

TECHNICAL BACKGROUND

Generally, within the technical field of shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber depends on the pressure created by a valve arrangement. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

Traditional valve arrangements of the pressure regulating type described above generally have the disadvantage that when experiencing an electrical or mechanical malfunction to the solenoid or to the control system the valves may be left in an open or closed state; if left in an open state the flow path between the compression chamber and the rebound chamber is opened, resulting in a substantially unrestricted flow of hydraulic fluid between said chambers and consequently substantially no damping force. Alternatively, when the malfunction results in a closed state of the valve, the flow path is substantially closed, resulting in a too high damping force.

State of the art valve arrangements for shock absorbers have a failsafe mode where a bypass flow allows a predetermined flow of damping medium between the chambers. However, these bypass flows are sensitive to vibrations and flow forces generated from the damping medium flowing through the restrictions.

Therefore, there is a need for a valve arrangement for use in shock absorbers having a controlled bypass flow for failsafe operation which is less affected by vibrations and flow forces.

SUMMARY OF THE INVENTION

An objective of the present invention is to provide an improved valve arrangement having a more stable and reliable failsafe operation, resulting in a more dependable valve arrangement.

These and other objectives are achieved by a valve arrangement being suitable for a shock absorber and comprising a valve housing comprising a first and a second port, a pilot chamber being in fluid communication with said first and/or second port, wherein a pilot pressure is defined by a hydraulic pressure in said pilot chamber. Further comprising a main valve member being axially movably arranged in said valve housing and being arranged to interact with a main valve seat of said valve housing in order to restrict a main fluid flow between said first and second ports in response to said pilot pressure acting on said main valve member, and a control valve member being movable in an axial direction relative said main valve member in response to an actuating force acting on said control valve member, said control valve member being resiliently loaded in an opposite direction to said actuating force by means of a biasing member. Wherein said valve housing further comprises a geometrically defined axial stop for preventing said control valve member from moving axially past said stop in the biasing direction and wherein the interface between said control valve member and said main valve member comprises a recess so that, when said control valve member is held against the axial stop by means of said biasing member, said recess form a radial column between the control valve member and the main valve member allowing an axial failsafe flow of the damping medium.

The invention is based on the insight that traditional radial fail safe flows create turbulence which affects the axial position of the control valve member by direct axial forces and increased friction due to radial forces acting on the control valve member. By instead providing a radial column with an axial failsafe flow, the fail safe flow is not dependent on the exact axial position of the control valve member for creating the fail safe restriction, and moreover less turbulence arise affecting the axial position of the control valve member. Thus, by providing a valve arrangement according to above, the valve arrangement becomes more stable and reliable in failsafe operation and thereby also a more dependable valve arrangement than prior art.

Specifically, by having a biasing member biasing the control valve member against an axial stop during fail safe operation reduces the sensitivity of that the free length of the biasing member is exactly configured. Thus, although the free length of the biasing member varies either e.g. over time due to aging or due to differences in installation or production, the same effect may be achieved. Moreover, by defining the fail safe flow by means of the radial column and allowing an axial fail safe flow, as opposed to an axial restriction and a radial or angled flow, the pressure restriction is created in parallel to the control valve member's axial movement, as opposed to transversally said axial movement. Thereby, the disturbance on the axial position of the control valve member is decreased, also the exact axial position of the control valve member is of less importance and thereby ultimately a more dependable valve arrangement is provided.

Simply put, a valve arrangement with the above configuration may provide a dependable failsafe flow with a larger marginal of error of components.

In the application the wording "restrict a flow" should be interpreted as regulating a pressure and/or the flow itself. Moreover, when writing about the recess the wording "the interface between said control valve member and said main valve member" means that the recess may be created by e.g. removing material from the control valve member or from the main valve member, or a combination of material from each of the two valve members. Moreover, the fail safe flow is defined as a flow of damping medium bypassing the main fluid flow when the actuating force is below a predetermined force. Further, it should be understood that the actuating force is provided in at least an axial direction. Moreover, it is understood that the resilient loading on the control valve member counteracts the actuating force. This may be advantageous when the actuating force is provided by an actuating arrangement providing an actuating force solely in one direction, e.g. a solenoid-based actuating arrangement.

According to one embodiment, when said control valve member is held against the axial stop, the control valve member closes the pilot chamber so as to build up an enclosed pressure in the pilot chamber which holds the main valve member against said main valve seat and thereby blocks the main flow between said first and second ports. Thereby, the built up pressure can hold the main valve member in a closed position, resulting in that the only flow is the axial fail safe flow through the radial column, thus the valve arrangement ensures that the main flow is closed so as to avoid a substantially unrestricted flow of hydraulic fluid between said chambers and consequently substantially no damping force.

According to another embodiment the enclosed pressure in the pilot chamber also holds the control valve member in contact with the axial stop. Thereby, the control valve member is also held against the stop by the enclosed pressure, allowing a dependable valve arrangement.

According to yet another embodiment, the control valve member is held by using differential areas on both sides on the pilot seat and releasing the pressure thru the pilot stage.

According to another embodiment, the free length of the biasing means is adapted to bring the control valve member into contact with said axial stop when said actuating force acting on said control valve member is less than a predetermined value. Thereby, the biasing means will assure that the control valve member is brought into the failsafe position. However, although the biasing means may hold the control valve in the failsafe position, it is mainly held in said failsafe position by means of an enclosed pressure in the pilot chamber. Said predetermined value of the actuating force may in one example correspond to the biasing force of the biasing means. In an example when the biasing means is a spring arrangement, the predetermined value may correspond to the total spring force acting on the control valve member. Moreover, the biasing means may be arranged to axially move or force the control valve member to a failsafe position when no actuating force is received. It is understood that the case when no actuating force is received refers to when there is electrical or mechanical malfunction to the actuating system.

According to yet another embodiment the biasing means comprises a biasing spring member. Thereby, the biasing force may be achieved through reliable tested components with low cost.

According to another embodiment the biasing means comprises a first failsafe spring member and a biasing spring member arranged in series with a spring base member there between. In one embodiment the spring stiffness of the failsafe spring member may be lower than the stiffness of the biasing spring member. The spring stiffness of the failsafe spring member may be chosen such that the spring base member is inoperable during normal operation, i.e. when an actuating force is received. For example, the spring base member may rest against the main valve member during normal operation, and may be released from the main valve member during failsafe operation, i.e. when no actuating force is received. Consequently, during failsafe operation, the failsafe spring member and the biasing spring member act together in series to force the control valve member to the failsafe position.

According to yet another embodiment, the control valve member is arranged at least partially within said main valve member as seen in an axial direction. Thereby, a compact valve arrangement with low building height is achieved.

According to another embodiment the radial column between the control valve member and the main valve member is created along the outer circumference of the control valve member and the inner circumference of the main valve. Thereby, the failsafe flow may be distributed around the whole circumference of the control valve member, which may reduce flow disturbance and forces acting on the control valve member.

According to yet another embodiment of the present invention, the main valve member comprises a first lifting surface area arranged to axially separate the main valve member from the main valve seat in response to a hydraulic pressure in the first port, and a second lifting surface area arranged to axially separate the main valve member from the main valve seat in response to a hydraulic pressure in the second port. Thereby, the main valve member may comprise a first lifting surface having a radial extent such that the pressure of the hydraulic fluid in the first port acts on the first lifting surface to exert a pressure lifting force on the main valve member. Correspondingly, the second lifting surface may have a radial extent such that the pressure of the hydraulic fluid in the second port acts on the second lifting surface to exert a pressure lifting force on the main valve member. Having such first and second lifting surfaces is advantageous since the main valve member may restrict or adjust a pressure in the main fluid flow in both directions, i.e. either from the first port to the second port or from the second port to the first port.

According to another embodiment the actuating force acting on said control valve member is generated by a solenoid. Thereby the control valve member may be movable in the axial direction relative the main valve member in response to an electric current. E.g. the actuating force may be transmitted by an actuating rod which may have a magnetic member on which a solenoid exerts a force in response to the electric current.

According to another embodiment the pilot pressure is regulated by a pressure regulator integrated in said control valve member. Thereby, a compact pressure regulation of the pilot pressure may be achieved. Moreover, no separate components are needed to control the pilot pressure.

According to another embodiment the valve arrangement further comprises a pilot valve member axially movable within said control valve member, said pilot valve member being arranged to interact with a pilot valve seat of said control valve member to restrict a pilot fluid flow out from said pilot chamber. Thereby, the pilot pressure may be controlled by adjusting the axial position of the pilot valve member relative the control valve member, resulting in an adjustment of the opening between the pilot valve member and the pilot valve seat to allow higher or lower flow of damping fluid.

According to yet another embodiment the pilot valve member is resiliently loaded towards said pilot valve seat relative said main valve member or said valve housing, such that the resilient loading on said pilot valve member is adjustable in response to said pilot actuating force. In an alternative embodiment the pilot valve member is instead resiliently loaded towards said pilot valve seat relative said control valve member, such that the resilient loading on said pilot valve member is adjustable in response to said actuating force. Thereby, the restriction on the pilot fluid flow out from the pilot chamber is adjusted by providing a control valve member arranged to interact with the pilot valve member to adjust the pretension or resilient loading on the pilot valve member in response to an actuating force acting on the control valve member. Moreover, through this embodiment the actuating force may be provided by an actuating arrangement providing an actuating force solely in one direction, e.g. a solenoid-based actuating arrangement.

According to another embodiment the valve arrangement further comprises an intermediate pilot valve member arranged between the pilot valve seat and the pilot valve member. The intermediate pilot valve member may be resiliently loaded towards the pilot valve member in a direction away from the pilot valve seat. The intermediate pilot valve member will thus act on the pilot valve member to prevent or reduce closing of the pilot valve.

According to yet another embodiment the intermediate pilot valve member may be flexible or deflectable in the axial direction and may be disc or plate shaped. Such an intermediate pilot valve member may also be described as a shim or a plurality of shims stacked on top of each other. It is understood that a flexible or deflectable pilot valve member refers to a washer-type valve member having a bending or flexural rigidity to deflect when acted upon by the hydraulic pressure in the valve arrangement, e.g. valve member punched or etched out of a sheet of spring steel.

According to another embodiment the pilot valve seat has a greater radial extent than the pilot valve member. The pilot valve seat may be defined by an annular valve seat having a diameter greater than the outer diameter of pilot valve member. The difference in radial extent or diameter defines a differential area achieving a pressure feedback effect between the two sides of the intermediate pilot valve member, i.e. between the pressures up-stream and down-stream of the pilot restriction. Due to the differential area, the pressure up-stream of the pilot restriction will act on a larger area on the intermediate pilot valve compared to the pressure down-stream. The pressure feedback will thus have little effect when there is little difference between the pressures up- and down-stream of the pilot restriction, i.e. when the pilot restriction achieves little restriction on the pilot fluid flow. In this case, the pressure feedback will act to force the intermediate pilot valve member away from the pilot valve seat to open the pilot restriction. When the pressure upstream is substantially greater than the pressure downstream of the pilot restriction, the closing pressure force of the pilot pressure will dominate, and the pressure feedback will have its greatest effect.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

Further details and aspect of the present invention will become apparent from the following detailed description with reference to accompanying drawings, in which:

FIG. 6 shows a cross-section of an embodiment when the biasing means 14 comprises a failsafe spring 15 member and a biasing spring member 16, which are arranged in series with a spring base member 17 there between.

DETAILED DESCRIPTION OF EMBODIMENTS

Figure 1:
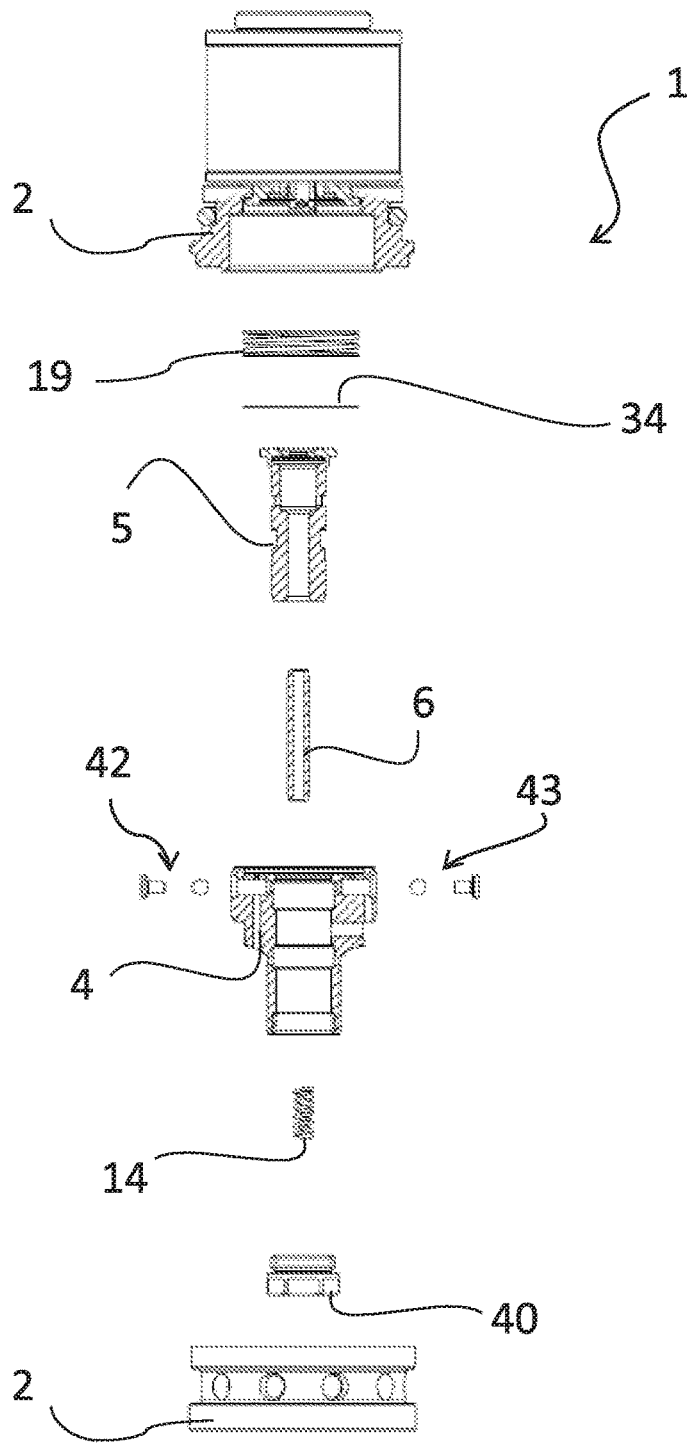
FIG. 1 shows an exploded view of an embodiment of the valve arrangement.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 2:
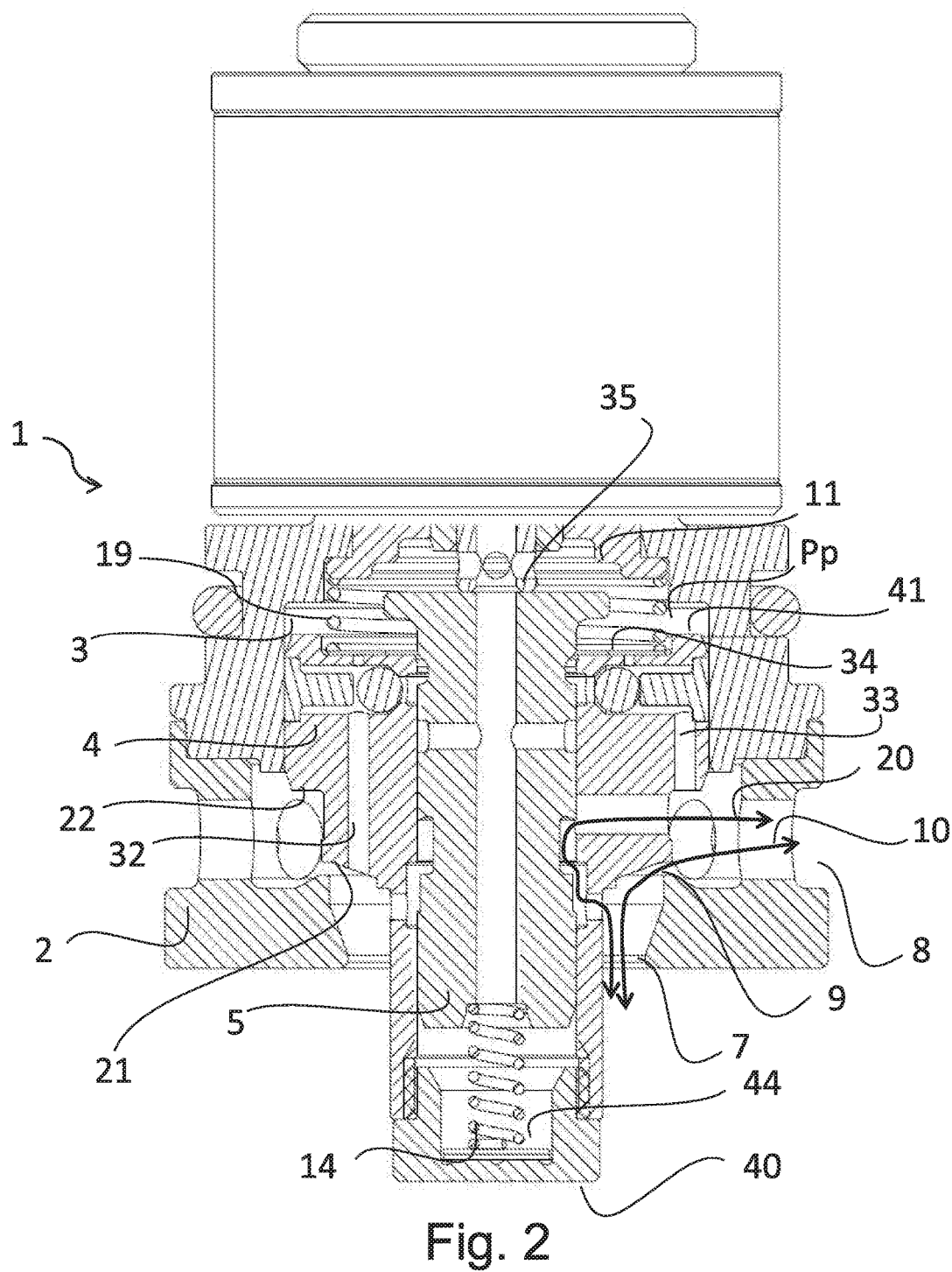
FIG. 2 shows a cross-section of an embodiment when the main valve member is in a partly open position to allow a regulated main flow between the first port and the second port, and a bypass flow through the control valve member.
Figure 3A:
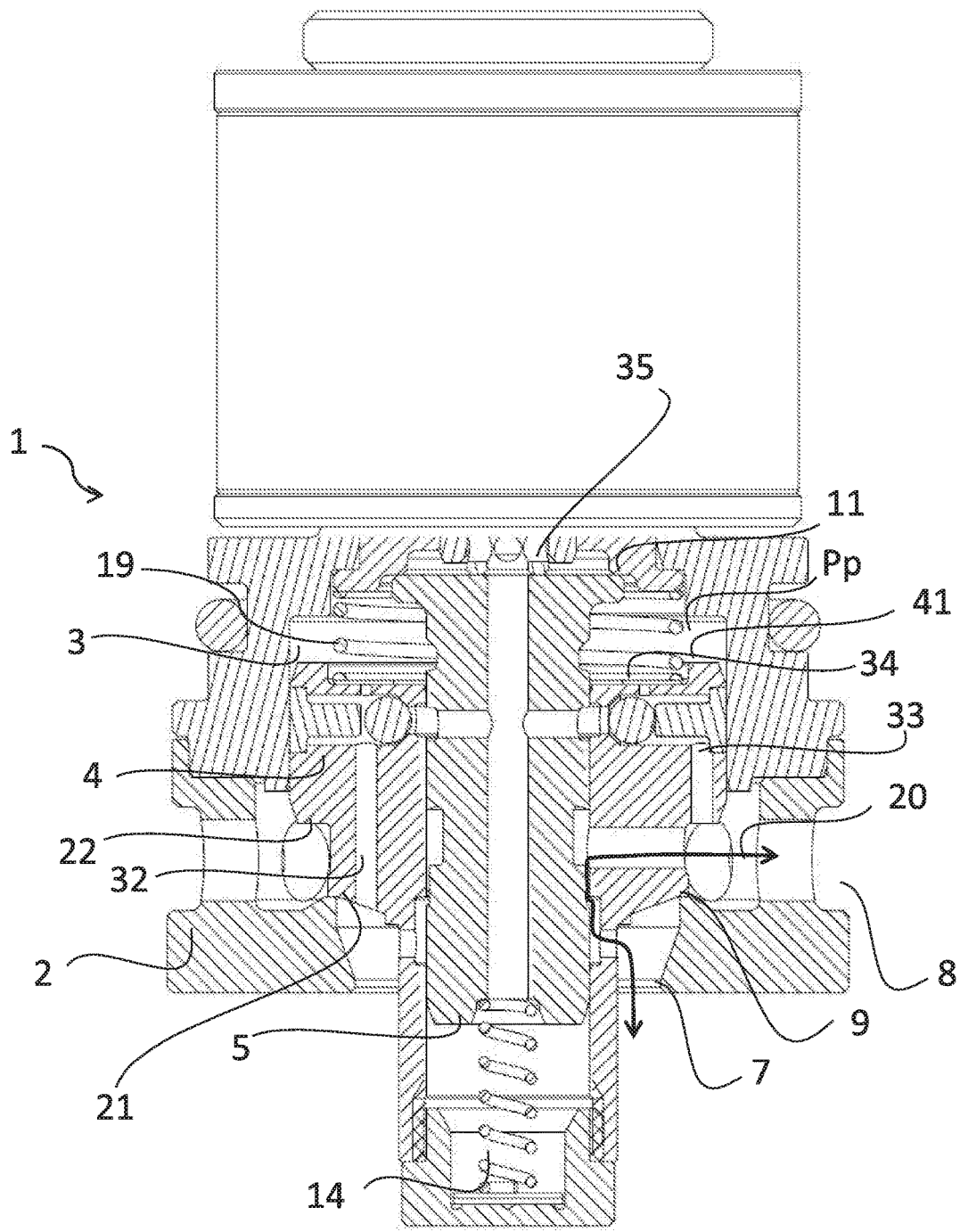
FIG. 3a shows a cross-section of an embodiment, where the main valve member is in a closed position to block a main flow between the first port and the second port, and the control valve is in a failsafe axial position, so as to allow a failsafe flow of damping medium.
Figure 3B:
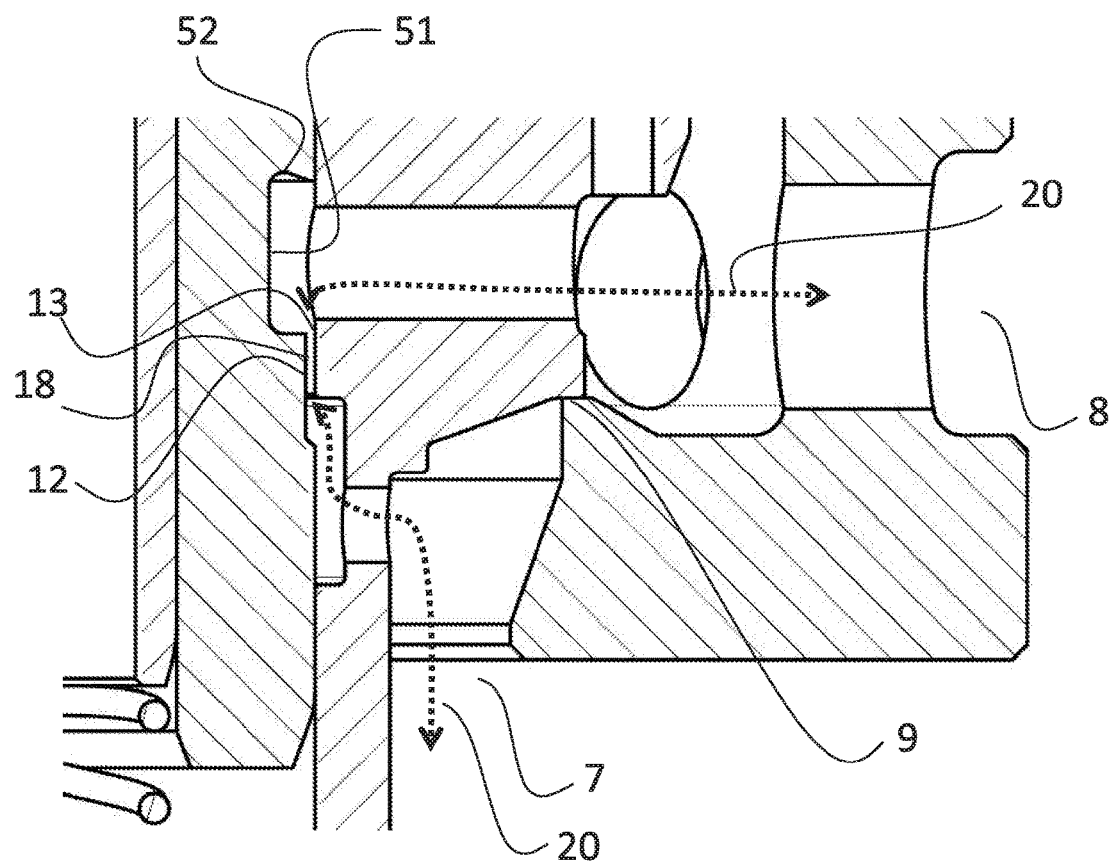
FIG. 3b is a close-up of the failsafe flow as illustrated in FIG. 3a, FIG. 4 shows a cross-section of an embodiment when the valve arrangement comprises a pilot valve member and the main valve member is in a partly open position to allow a regulated main flow, and a bypass flow through the control valve member, between the first port and the second port.
Figure 4:
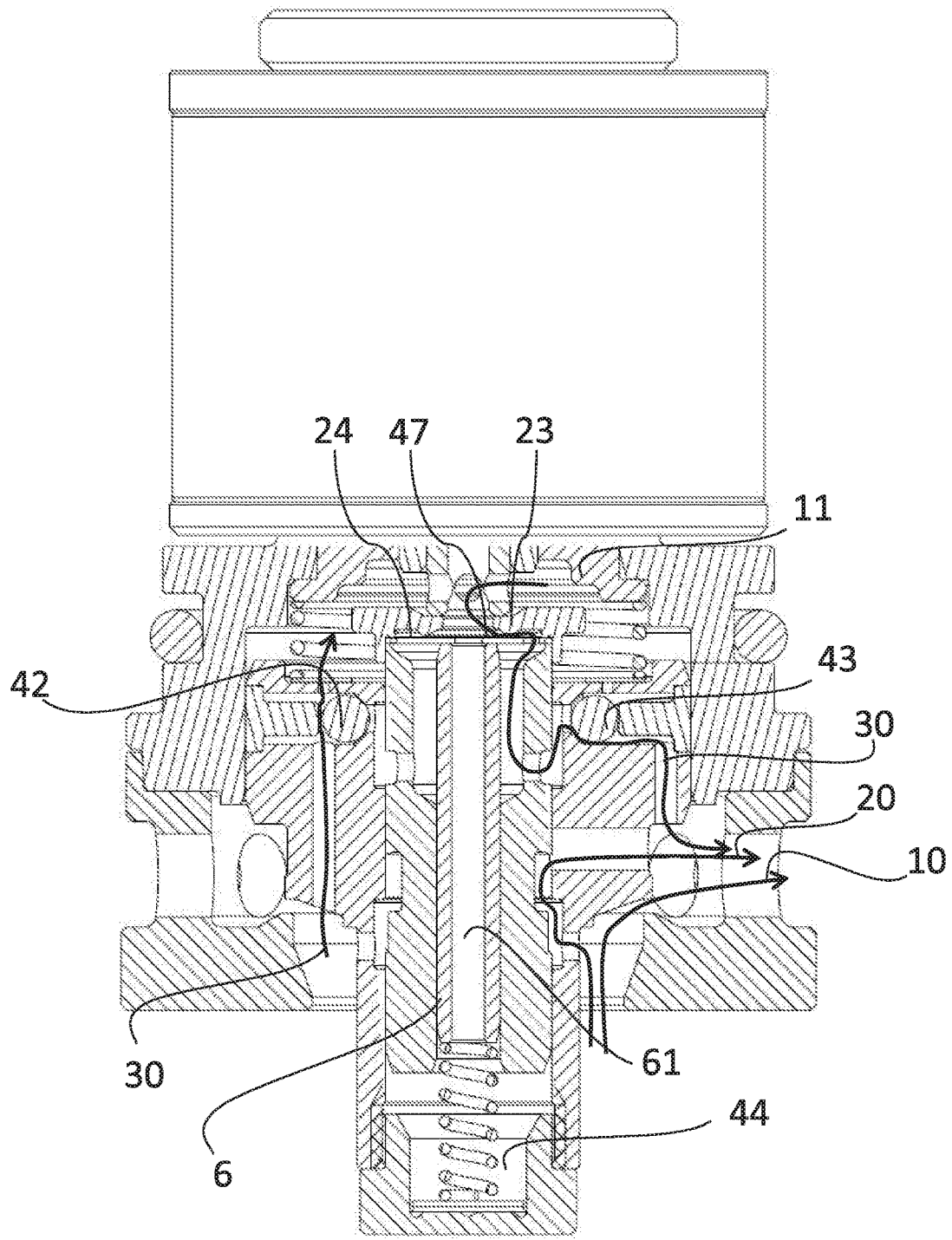

In the following, the valve arrangement is in the embodiments illustrated in FIG. 2-4 are configured for restricting fluid flows in both directions between the first and second ports. However, the concept is equally applicable in a one-way flow valve arrangement as is illustrated in FIG. 5.

Figure 5:
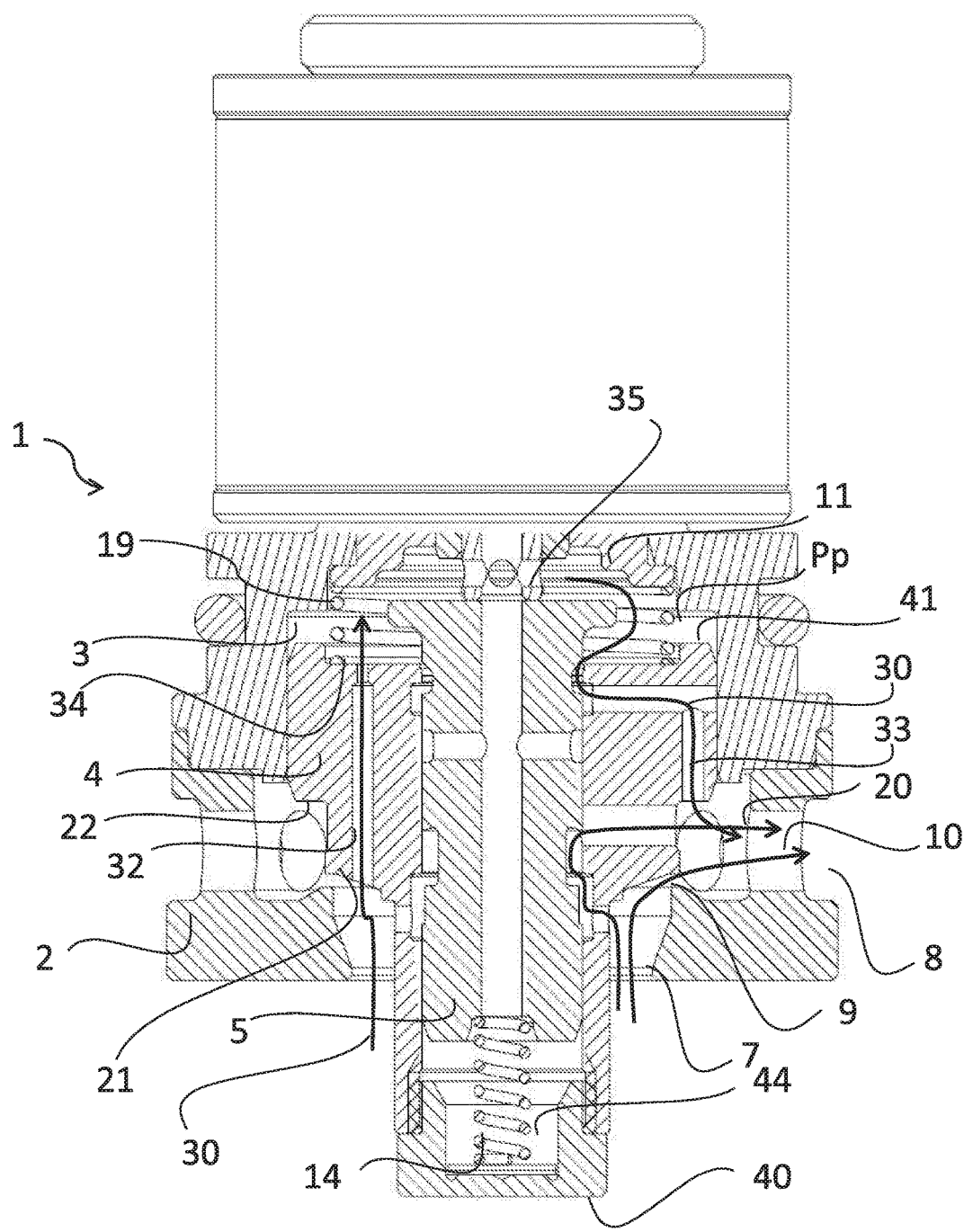
FIG. 5 shows a cross-section of an embodiment when the valve assembly is a one-way valve assembly and the main valve member is in a partly open position to allow a regulated main flow from the first port to the second port, and a bypass flow through the control valve member.

Although FIG. 5 only shows a one-way valve without the pilot valve member 6, the invention is equally relevant for a one-way valve having a pilot valve member.

FIG. 1 shows a cross-sectional exploded view of a valve arrangement. The valve arrangement 1 comprises a valve housing 2 (with an upper and a lower portion), a main valve member 4, a control valve member 5 and a pilot valve member 6. The figure further illustrates several details of an embodiment of the valve arrangement such as one-way valves 42, 43 and biasing means 14. However, these details will be further explained in relation to FIGS. 2-5, where their respective function also will be described. Instead, FIG. 1 is mainly included in the application to clarify the form of each component and thereby facilitate the reading and understanding of the application.

FIG. 2 shows a cross-sectional view of a first embodiment of a valve arrangement. The valve arrangement 1 comprises a valve housing 2, a pilot chamber 3, a main valve member 4, and a control valve member 5. The valve housing 2 comprises a first and a second port 7, 8. In the illustrated embodiment, the first and second ports act as inlet and outlet ports, respectively, for inlet and outlet of hydraulic fluid. The main valve member 4 is axially movably arranged in the valve housing 2 and is arranged to interact with a main valve seat 9 of the valve housing in order to restrict (or regulate a pressure) in a main fluid flow 10 between the first port 7 and the second port 8 in response to a pilot pressure Pp acting on an upper surface 41 of the main valve member 4. In this embodiment, the main valve member 4 is resiliently loaded towards the main valve seat towards a closed position by a main helical spring member 19 acting on the upper surface 41 of the main valve member. In other embodiments, the main valve member may be resiliently loaded by other types of spring members or may be flexible and/or resilient itself to achieve the desired resilient loading.

Figure 6:
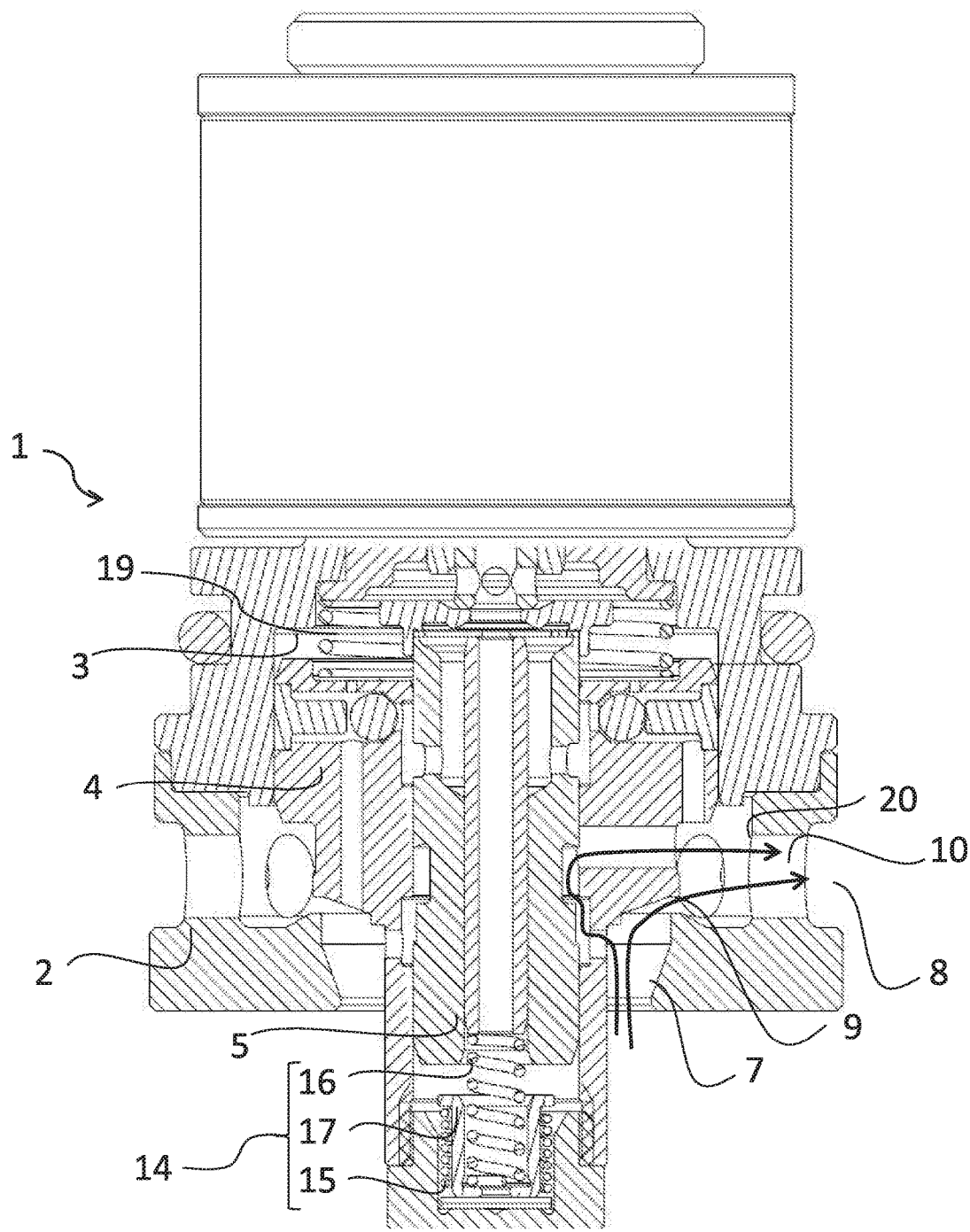

Further, the control valve member 5 is resiliently loaded towards an axial stop 11 relative said main valve member by a biasing means 14, in this embodiment being a spring member 14. In other embodiments, as illustrated in FIG. 6, the biasing means 14 may comprises both a failsafe spring 15 member and a biasing spring member 16, which may be arranged in series with a spring base member 17 there between. The spring stiffness of the failsafe spring 15 member may be lower than the stiffness of the biasing spring member 16, such that the spring base member 17 is inoperable during normal operation, i.e. when an actuating force is received. The spring base member 17 may rest against a seat portion of the main valve member during normal operation, and may be released from the main valve member during failsafe operation. During failsafe operation the failsafe spring member 15 and the biasing spring member 16 would then act together in series to force the control valve member to the failsafe position against the axial stop 11. The axial stop may be formed in basically any way preventing the control valve member from moving axially past the axial stop. The axial stop 11 in FIGS. 2 and 3a is formed so that a substantially flat surface of the main valve housing 2 interacts with a substantially flat top surface of the control valve member. Thereby, wear on the respective surfaces is limited as the contact area is relatively large.

The pilot chamber 3 is defined by the space formed between the upper surface 41 of the main valve member and inner walls of the valve housing 2. The pilot chamber 3 is in fluid communication with the first port 7 via a first axial through hole 32 in the main valve member 4 and with the second port 8 via a second axial through hole 33 in the main valve member 4. In the illustrated embodiment, a disc- or plate-shaped one-way valve member 34 which is flexible or deflectable in the axial direction is arranged on the upper surface 41 of the main valve member to cover the axial through holes 32 and 33, thereby forming one one-way valve to allow hydraulic fluid flow through the first axial through hole 32 solely in the direction from the first port to the pilot chamber, and one one-way valve to allow hydraulic fluid flow through the second axial through hole 33 solely in the direction from the second port to the pilot chamber 3. In other embodiments, the one-way valves may be of another type, for example of the ball-valve type. The pilot pressure Pp acting on the upper surface 41 of the main valve member 4 is defined by a hydraulic pressure in the pilot chamber 3.

The control valve member 5 is of a substantially cylindrical shape and is arranged coaxially with and partially within the main valve member, and extends above the upper surface 41 into the pilot chamber 3. The control valve member 5 is furthermore movable in an axial direction relative the main valve member in response to an actuating force acting on the control valve member. In this embodiment, the actuating force is received by an actuating rod 35. The actuating rod may be an axially movable magnetic member on which a solenoid exerts a force in response to an electric current.

In FIG. 2, the hydraulic pressure in the first port 7 acting on the lifting area 21 of the main valve member 4 is large enough to overcome the opposing forces of the main helical spring member 19 and the pilot pressure Pp acting on the main valve member. The lifting area 21 may also include the bottom surface 40 of the main valve member.

Further, the main valve member 4 is in a partly open position in FIG. 2 so as to allow a regulated main fluid 10 flow between the first port and the second port (in either or both directions), and a bypass flow 20 through the control valve member 5. These two flows are present during active control operation of the valve arrangement. The control of flow is carried out by means a solenoid exerting an actuating force via an actuating rod 35 on the control valve member 5, and thereby regulating the flow of damping medium between the two ports 7, 8. More specifically, the control valve member 5 comprises a first bypass valve portion in the form of an edge 52 of an annular groove 51 in the envelope surface of the control valve member 5. The main valve member 4 comprises a second bypass valve portion in the form of an inner edge of an annular recess 13 in the main valve member 4. The first bypass valve portion is arranged to interact with the second bypass valve portion of the main valve member 4 to define a bypass restriction on a bypass fluid flow 20 between the first port 7 and the second port 8. The bypass fluid flow bypasses the main fluid flow 10. When the control valve member 5 moves axially in response to the actuating force, the overlap between the groove 51 in the control valve member 5 and the recess 13 in the main valve member (the edges of which form the first and second bypass valve portions) varies, thereby adjusting the effective flow restriction area on the bypass fluid flow 20.

In FIGS. 3a and 3b the main valve member 4 is in a closed position to block the main flow 10 between the first and second port 7, 8, and the control valve 5 is in a failsafe axial position, wherein above-mention bypass flow is a failsafe flow 20 of damping medium. The valve arrangement 1 is designed to allow this operation mode in the case when no actuating force (from the rod 35) is received is illustrated, i.e. for example when there is electrical or mechanical malfunction to the actuating system. Since no actuating force is received, the biasing spring member 14 forces the control valve member 5 upwards to the illustrated failsafe position, in which failsafe position the flow path from the pilot restriction to the second port 8 is closed and the bypass restriction, or more specifically failsafe restriction, is open to achieve a predetermined restriction on the bypass fluid flow 20. The opening, as more clearly illustrated in FIG. 3b is constituted by the radial column 18 which allows an axial flow 20 of damping medium. The radial column 18 may be constituted by a recess 12, 13 in either one of or both of the main valve member 4 and/or the control valve member 5. Moreover, as illustrated in the figures, the valve housing 2 comprises an axial stop 11 which is sized and adapted for preventing the control valve member 5 from moving axially past the axial stop in the biasing direction. This design makes the failsafe position of the control valve member 5 very reliable, as there is a geometrical stop for the axial movement which the biasing spring member 14 can hold the control valve member against. In the failsafe position, the control valve member 5 is held against the axial stop 11 and thereby the control valve member 5 closes the pilot chamber 3 so as to build up an enclosed pressure in the pilot chamber 3 which holds the main valve member 4 against the main valve seat 9 and thereby keeps the main flow 10 closed between said first and second ports 7, 8. Consequently, hydraulic fluid is prevented from leaving the pilot chamber and the pressure of the hydraulic fluid in the pilot chamber 3 will prevent the main valve member 4 from being released or lifted from the main valve seat 9. In the failsafe position, the overall flow between the first and the second port is thus determined solely by the predetermined restriction on the bypass fluid flow 20 defined by the radial column 18 allowing an axial flow 20. Thus, the axial position of the control valve member relative the main valve member does not constitute the actual restriction, but instead the restriction is decided by the width of the radial column 18.

FIG. 4 shows a cross-section of an embodiment of the valve arrangement 1 when it comprises a pilot valve member 6 and the main valve member 4 is in a partly open position to allow a regulated main fluid flow 10 between the first port 7 and the second port 8, and a bypass flow through the control valve member 5. Thus, the difference between the embodiment in FIG. 4 compared to FIGS. 2 and 3 is that this embodiment also comprises the pilot valve member 6.

The pilot valve member 6 is substantially cylindrical in shape and is axially movable within the control valve member relative the main valve member 4 and relative the control valve member 5. The upper end of the pilot valve member comprises an upper portion 47 which is arranged to interact with an annular pilot valve seat 23 of the control valve member to restrict a pilot fluid flow out from the pilot chamber to the second port 8. The pilot valve member 6 is resiliently loaded towards the pilot valve seat relative said main valve member by a biasing means 14, in this embodiment being a spring member. Since the pilot valve seat 23 is a portion of the control valve member 5, the pre-tension on the resilient loading on the pilot valve member is adjustable by axial movement of the control valve member 5 in response to the actuating force.

Moreover, the illustrated embodiment in FIG. 4 comprises an intermediate pilot valve member 24 arranged between said pilot valve seat 23 and said pilot valve member 6. The intermediate pilot valve member 24 is resiliently loaded towards said pilot valve member in a direction away from said pilot valve seat 23. The intermediate pilot valve member 24 is furthermore provided with an orifice or through hole to restrict a hydraulic fluid flow there through between the pilot chamber and the damping volume via the through hole 61 in the pilot valve member 6. The orifice or through hole has an effective flow area to form a damping flow restriction arranged to restrict fluid flow between the damping volume and the pilot chamber such that relative movement between the main valve member and the control valve member is hydraulically damped.

The pilot pressure Pp is thus determined by a balance between the incoming fluid flow from the first port 7 to the pilot chamber 3 and the outgoing pilot fluid flow from the pilot chamber to the second port 8 (or the other way around depending on the flow direction), the latter being determined by the pilot restriction. The pilot pressure Pp will act on the upper end of the pilot valve member to exert a downwardly directed pressure force which will act to open the pilot valve. The effective flow area of the pilot restriction is determined by the stroke of the pilot valve member relative the pilot valve seat. This stroke is determined by a balance between the pressure force and the counteracting spring force from the biasing spring member 14 (and the intermediate pilot valve member 24 when present). The pilot restriction is thus of the pressure-regulating type. As mentioned above, the pre-tension of the biasing spring member is adjustable in response to the actuating force.

Moreover in FIG. 4 it is further illustrated that the space formed between the lower end of the control valve member 5 and the inner surface of the cup-shaped lower end of the main valve member 4, i.e. just above the bottom surface 40 of the main valve member 4, defines a damping volume 44. The pilot valve member 6 has a through hole 61 extending in the axial direction there through for fluid communication between the damping volume 44 and the pilot chamber 3. The axial through hole 61 also results in that essentially the same pressure acts on both axial end surfaces of the pilot and control valve members, thereby eliminating the need for the actuating force to overcome a force resulting from a pressure difference over the control valve member.

Moreover, in all embodiments illustrated in FIG. 2-4, the valve arrangements comprise two one-way valves 42, 43 of the ball-valve type. The one-way valves may be of any type of one-way valves such as shims valves etc. The one way valves 42, 43 are arranged in the pilot flow path to allow fluid flow solely in one direction from the pilot chamber 3 to the first port 7 or second port 8. The two one-way valves 42, 43 together form a directional valve arrangement ensuring that the pilot fluid flow flows to the port in which the hydraulic pressure is the lowest. Thereby, the valve arrangement may be used in a two-way valve arrangement. It is understood that the ball of the first one of the one-way valves is held in closed position by the pressure difference over the pilot restriction, and that the ball of the other one-way valve is moved to an open position by the pilot fluid flow. Thus, the two one-way valves work independently of each other, but in response to the same pressures and pressure differences to achieve the desired directional valve functionality.

However, the inventive concept is equally applicable to a one-way valve arrangement, which is illustrated in FIG. 5 which shows a cross-section of an embodiment when the valve assembly is a one-way valve assembly and the main valve member is in a partly open position to allow a regulated main fluid flow from the first port to the second port, and a bypass flow through the control valve member. The valve arrangement in FIG. 5 is in an active control operation which can be compared to the operation of the valve arrangement in FIG. 2. The restriction on the main fluid flow 10 is adjustable by adjusting the pilot pressure by adjusting the restriction on the pilot fluid flow 30 from the pilot chamber to the second port. This adjustment is achieved by adjusting the actuating force acting on the control valve member. The restriction of the main fluid flow 10 is thus of the pressure regulating type.

Although exemplary embodiments of the present invention have been shown and described, it will be apparent to the person skilled in the art that a number of changes and modifications, or alterations of the invention as described herein may be made. Thus, it is to be understood that the above description of the invention and the accompanying drawing is to be regarded as a non-limiting example thereof and that the scope of the invention is defined in the appended patent claims.

The invention claimed is:

1. A valve arrangement for a shock absorber, said valve arrangement comprising:
   a valve housing comprising a first and a second port;
   a pilot chamber being in fluid communication with said first and/or second port, wherein a pilot pressure is defined by a hydraulic pressure in said pilot chamber;
   a main valve member being axially movably arranged in said valve housing and being arranged to interact with a main valve seat of said valve housing in order to restrict a main fluid flow between said first and second ports in response to said pilot pressure acting on said main valve member; and
   a control valve member being movable in an axial direction relative said main valve member in response to an actuating force acting on said control valve member, said control valve member being resiliently loaded in an opposite direction to said actuating force by means of a biasing member,
   wherein said valve housing further comprises a geometrically defined axial stop for preventing said control valve member from moving axially past said stop in the biasing direction, and
   wherein the interface between said control valve member and said main valve member comprises a recess so that, when said control valve member is held against the axial stop by means of said biasing member, said interface between said control valve member and said main valve member forms a radial column restricting an axial failsafe flow of the damping medium, wherein the failsafe flow restriction is determined by the width of the radial column and is based at least in part on the adjustable position of said control valve member relative to said axial stop.

2. The valve arrangement according to claim 1, wherein said enclosed pressure in the pilot chamber also holds the control valve member in contact with the axial stop.

3. The valve arrangement according claim 1, wherein the free length of the biasing means is adapted to bring the control valve member into contact with said axial stop when said actuating force acting on said control valve member is less than a predetermined value.

4. The valve arrangement according to claim 1, wherein said biasing means comprises a biasing spring member.

5. The valve arrangement according to claim 1, wherein said control valve member is arranged at least partially within said main valve member.

6. The valve arrangement according to claim 1, wherein said radial column between the control valve member and the main valve member is created along the outer circumference of the control valve member and the inner circumference of the main valve.

7. The valve arrangement according to claim 1, wherein said main valve member comprises a first lifting surface area arranged to axially separate said main valve member from said main valve seat in response to a hydraulic pressure in said first port, and a second lifting surface area arranged to axially separate said main valve member from said main valve seat in response to a hydraulic pressure in said second port.

8. The valve arrangement according to claim 1, wherein said actuating force acting on said control valve member is generated by a solenoid.

9. The valve arrangement according to claim 1, wherein said pilot pressure is regulated by a pressure regulator integrated in said control valve member.

10. The valve arrangement according to claim 1, further comprising a pilot valve member axially movable within said control valve member, said pilot valve member being arranged to interact with a pilot valve seat of said control valve member to restrict a pilot fluid flow out from said pilot chamber.

11. The valve arrangement according to claim 10, wherein said pilot valve member is resiliently loaded towards said pilot valve seat relative said main valve member or said valve housing, such that the resilient loading on said pilot valve member is adjustable in response to said actuating force.

12. The valve arrangement according to claim 10, wherein said pilot valve member is resiliently loaded towards said pilot valve seat relative said control valve member, such that the resilient loading on said pilot valve member is adjustable in response to said actuating force.

13. The valve arrangement according to claim 10, further comprising an intermediate pilot valve member arranged between said pilot valve seat and said pilot valve member, wherein said intermediate pilot valve member is resiliently loaded towards said pilot valve member in a direction away from said pilot valve seat.

14. A valve arrangement for a shock absorber, said valve arrangement comprising:
   a valve housing comprising a first and a second port;
   a pilot chamber being in fluid communication with said first and/or second port, wherein a pilot pressure is defined by a hydraulic pressure in said pilot chamber;
   a main valve member being axially movably arranged in said valve housing and being arranged to interact with a main valve seat of said valve housing in order to restrict a main fluid flow between said first and second ports in response to said pilot pressure acting on said main valve member; and
   a control valve member being movable in an axial direction relative said main valve member in response to an actuating force acting on said control valve member, said control valve member being resiliently loaded in an opposite direction to said actuating force by means of a biasing member,
   wherein said valve housing further comprises a geometrically defined axial stop for preventing said control valve member from moving axially past said stop in the biasing direction, and
   wherein the interface between said control valve member and said main valve member comprises a recess so that, when said control valve member is held against the axial stop by means of said biasing member, said recess forms a radial column between the control valve member and the main valve member allowing an axial failsafe flow of the damping medium, wherein the failsafe flow restriction is determined by the width of the radial column, and
   wherein when said control valve member is held against the axial stop, the control valve member closes the pilot chamber so as to build up an enclosed pressure in the pilot chamber which holds the main valve member against said main valve seat and thereby blocks the main flow between said first and second ports.

15. A valve arrangement for a shock absorber, said valve arrangement comprising:

a valve housing comprising a first and a second port;

a pilot chamber being in fluid communication with said first and/or second port, wherein a pilot pressure is defined by a hydraulic pressure in said pilot chamber;

a main valve member being axially movably arranged in said valve housing and being arranged to interact with a main valve seat of said valve housing in order to restrict a main fluid flow between said first and second ports in response to said pilot pressure acting on said main valve member; and a control valve member being movable in an axial direction relative said main valve member in response to an actuating force acting on said control valve member, said control valve member being resiliently loaded in an opposite direction to said actuating force by means of a biasing member, wherein said valve housing further comprises a geometrically defined axial stop for preventing said control valve member from moving axially past said stop in the biasing direction, and wherein the interface between said control valve member and said main valve member comprises a recess so that, when said control valve member is held against the axial stop by means of said biasing member, said recess forms a radial column between the control valve member and the main valve member allowing an axial failsafe flow of the damping medium, wherein the failsafe flow restriction is determined by the width of the radial column, and wherein said biasing means comprises a first failsafe spring member and a biasing spring member arranged in series with a spring base member there between.

* * * * *